Dec. 28, 1937. N. B. NEWTON 2,103,433
FRICTION CLUTCH
Filed Oct. 16, 1935

Inventor:
Noel Banner Newton
By his Attorney:
Walter Gunn.

Patented Dec. 28, 1937

2,103,433

UNITED STATES PATENT OFFICE 2,103,433

FRICTION CLUTCH

Noel Banner Newton, Acton, London, England

Application October 16, 1935, Serial No. 45,297
In Great Britain October 24, 1934

15 Claims. (Cl. 192—107)

This invention relates to an improved clutch plate for friction clutches and more particularly to friction clutches of the kind incorporating relatively non-resilient friction linings, such as those made of the lining fabric sold under the registered trade-mark "Ferodo".

While friction clutches of this kind are extensively used and are both simple and efficient, it has long been known that such clutches in particular are liable to "shudder" as they are engaged to take up the load of the drive and various attempts have been made to overcome this fault. For example, it has been proposed to employ a compound clutch plate consisting of two parts separated by rubber. It has also been proposed, in clutches of the kind comprising a driven element disposed between two driving elements, the one driving element being usually in the form of a fly-wheel or other rotary member fixed on the driving shaft, the other driving member being in the form of an axially movable pressure plate or like member which serves to force the driven element into frictional engagement with the flywheel or other rotary member, to provide as the driven element two spaced transmission plates or members, relatively non-rotatable with respect to each other and carrying one or more resilient buffers between them.

In the previously known forms of clutch above referred to, the addition of the resilient member has generally materially increased the length of the clutch, which is a serious matter in the modern automobile. Also, the increased relative movement of the parts has involved a sliding movement for the driven member during the process of engagement and while under torsional stress. Further in such forms of construction the interposed resilient member is so much a part of the assembly that the clutch springs can never compress the parts of the assembly together as a solid or relatively non-resilient body of friction elements. The solid or relatively non-resilient body of friction elements of the old type of clutch having no resilient member had certain advantages.

On the other hand, it has also been proposed and is the form now generally in use, to provide "crimped" clutch plates having spring tongues standing out of the plane of the plate and adapted to provide a resilient initial engagement, but flattening under pressure so that the ultimate grip is solid. Such a construction of plate while combining the advantages of the two types of clutch has, however, considerably increased the cost of manufacture of the clutch because the whole plate must be made of spring steel and must be subject to heat treatment to temper the tongues, resulting often in distortion of the plate and other difficulties. On the other hand, when such crimped plates are made of non-tempered steel the set of the tongues is soon lost. In any case with a crimped plate the friction lining is only supported at local areas, giving uneven wear which ultimately defeats the effect of the crimping.

The object of the invention is an improved and simplified construction of clutch combining the advantages of the two known types of clutch, namely initial resilience for the relief from "shudder" and the positive final grip.

According to the invention the improved clutch plate comprises a pair of plates arranged back to back and having friction surfaces on their outer faces, means to prevent relative rotation between the plates and a plurality of non-flat (sprung) spring discs, adapted to be flattened under pressure, arranged between them behind the said friction surfaces.

Preferably, the collective resistance of the spring discs to being flattened is less than the grip of the clutch when fully engaged.

The expression "spring disc" as used above and hereafter in this specification is to be interpreted as including any relatively flat and sprung disc or washer of any shape or contour which is capable of being flattened under pressure, such as a star-shaped sprung washer.

According to a further feature of the invention, means are provided for initially loading or compressing the spring discs.

According to a still further feature of the invention, the initial loading means are arranged concentric with the spring discs.

According to yet another feature of the invention, the means for securing the spring discs to the plates also serves to secure the plates together.

In the accompanying drawing:—

Figure 1:
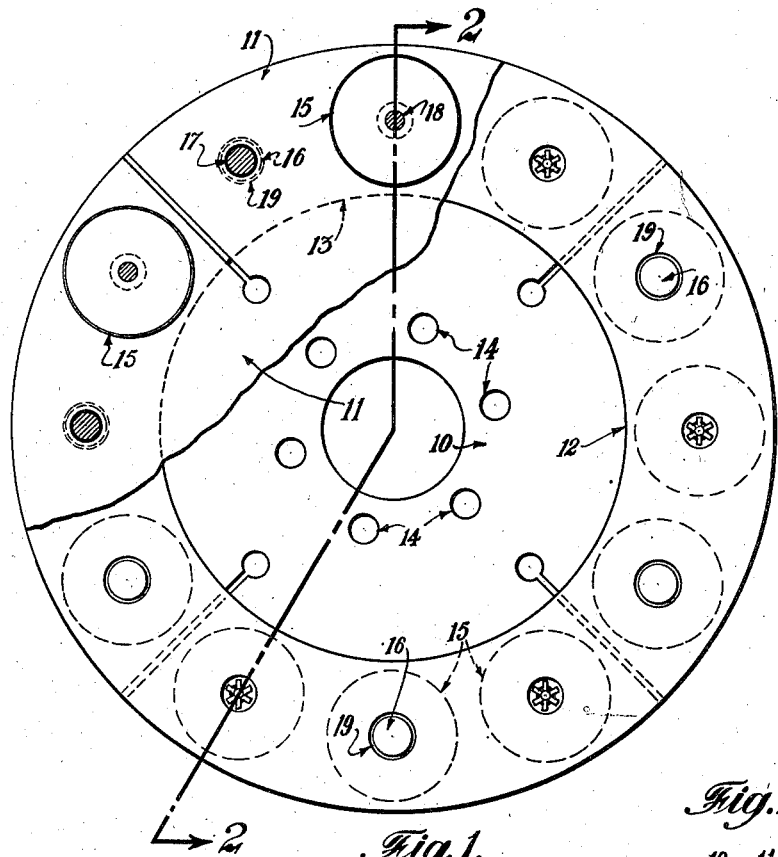
Fig. 1 is a front elevation of a central plate for a single plate clutch embodying the features of the invention.
Figure 2:
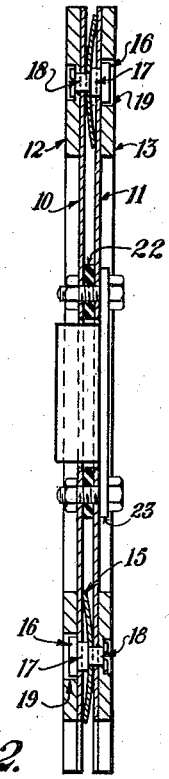
Fig. 2 is a section on line 2—2 of Fig. 1.
Figures 3, 4, 5:
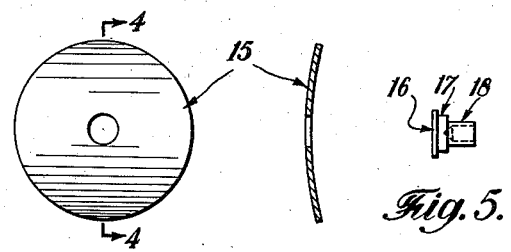
Fig. 3 is a front elevation of one of the spring discs, shown on a larger scale.
Fig. 4 is a sectional side elevation on line 4—4, Fig. 3, showing the cylindrical curvature of the disc.
Fig. 5 is an elevation of one of the loading rivets.

In the preferred form of the invention as illustrated in Figs. 1 and 2, the improved clutch plate adapted to be used as a single driven element arranged between the flywheel and a presser plate of a clutch comprises two plates 10 and 11 arranged back-to-back and carrying friction rings 12 and 13, one of which faces the flywheel and the other of which faces the presser plate. These two plates 10 and 11 are provided with bolt holes 14 by which they are adapted to be secured to a flange on the driven shaft and splined thereto. Between the two plates 10 and 11 are arranged spring steel discs 15 (see also Figs. 3 and 4) which are about 1¼ inch diameter, and 1/64 inch thick and are curved cylindrically to give about 3/32 inch normal separation of the two plates. Alternate discs 15 are secured to the backs of the plates 10 and 11 by rivets 16. Each rivet has a head which is designated 16, a neck part 17 and a stem 18. The head 16 is located in a clearance hole 19 in the friction ring 13 (or 12) while the spring disc 15 is located on the stem 18 which passes through a hole in the plate 10 (or 11) and its end riveted over so as to secure the friction ring 12 (or 13) thereto. The neck part 17 is a sliding fit in a hole in the plate 11 (or 10) and the length of the neck determines the initial load placed on the spring disc as the rivets hold the two plates together within the limit of the length of the neck. In an alternative arrangement all these discs may be disposed on one plate.

In use, as the pressure of the adjacent driving friction members is applied to the plates the spring discs provide a resiliency until they become entirely flattened under the pressure of the clutch springs and the two plates 10 and 11 are then a relatively solid unit (non-resilient) under the further and final grip of the clutch.

When the clutch is fully engaged the whole area of each spring disc provides a solid spacing member between the two plates. The discs could, if desired, be mounted so that there is no initial loading and then they could be relatively reversed on their rivets.

If desired, the discs may be placed under an initial load, or at least the two plates prevented from separating further than the normal separation by the discs by providing stops in the form of rivets between the plates, in addition to or instead of those used for securing the discs and which permit the required closing movement. Any such arrangement, however, for loading the discs other than at their centre tends to produce distortion of the plates and adds to the cost of manufacture.

The limitation of the resiliency by initial loading limits the necessary relative movement before a solid grip is obtained. The driven members can, therefore, be bolted direct to a flange 23 (see Fig. 2) on the driven shaft with or without a spacing washer 22 instead of being splined direct to the shaft, as was the case in one of the known clutches above referred to, the flexibility of the plates themselves permitting sufficient separation under the action of the spring discs. Of course, the flange would be splined to the driven shaft but the question of any relative movement of such flange on its splines during the take-up of the load is a very different matter in such an arrangement compared with the movement of splined plates because in the first place the take-up itself is unlikely to call for any such movement owing to the limited resilience of the clutch plate, and in the second place, a large area hub can be provided compared with the areas of the splines on a plate. This construction allows the standard type of plates to be used except for the absence of the inner splines and neither the size nor the cost of manufacture of the clutch is appreciably increased as the space occupied by the discs is very small, while they are also very cheap to produce and are easy to fit. The loading and spacing rivets and the attachment to the common flange constitute means for preventing relative rotation between the parts 10 and 11.

Figure 6:
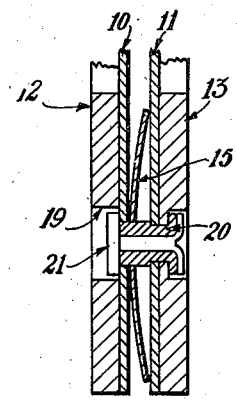
Fig. 6 is a part sectional elevation of a modified form of two part rivet.

In a modification of the invention, and so that the linings may be fixed as an operation separate from the fitting of the spring discs and of the spacing or loading rivets, the fixing rivets 20 as shown in Fig. 6 for the lining on one side may be tubular so that the spacing and loading rivets 21 may be passed through and secured in a subsequent operation while still being coaxial.

The concentric arrangement of the loading rivets provides the advantage that the spring discs may be loaded with the minimum liability of distortion of the clutch plates as the force of each disc is balanced at its own rivet and is localized to give a relatively short bending movement, in fact, the least possible bending movement. This condition is maintained even if the spring discs turn about their rivets or are unequally directed as regards their cylindrical curvature when being fixed. There is also a simplification in the design and construction of the plates of the clutch assembly, and of their linings, because there are fewer holes therein and there is not required the same consideration of stiffness and disposition of the loading rivets as when the latter are arranged in any other manner.

There are probably other modifications than those above described which may be devised without departing from the nature of this invention which must not be considered as limited to the details of the examples herein given. For example, the resilient discs may be spherically instead of cylindrically dished, or star or other shapes of spring elements may be employed. Also, two or more of the compound plates may be used in the same clutch and the clutch plates may be slotted in known manner to prevent undesirable effects from distortion.

What I claim is:—

1. An improved clutch plate comprising a pair of plates arranged back-to-back, friction linings secured to the outer faces of said plates, a plurality of non-flat (sprung) spring members adapted to be flattened under pressure arranged between the plates behind said friction surfaces but always separated therefrom by the plates, a rivet securing each spring member to one of the plates, each plate being formed for axial flexibility in the region of the friction surfaces and formed at its centre for rigid connection to a common flange.

2. An improved clutch plate comprising a pair of plates arranged back-to-back having friction surfaces on their outer faces, means to prevent relative rotation between the plates and a plurality of non-flat (sprung) spring discs, adapted to be flattened under pressure, arranged between the plates behind the said friction surfaces but always separated therefrom by the plates and a rivet positioned at the centre of pressure of each disc securing it to one of the plates.

3. An improved clutch plate comprising a pair of plates arranged back-to-back having friction surfaces on their outer faces, means to prevent relative rotation between the plates and a plurality of non-flat (sprung) spring discs, adapted to be flattened under pressure, arranged between the plates behind the said friction surfaces but always separated therefrom by the plates and a rivet positioned at the centre of pressure of each disc securing it to one of the plates, characterized in that some of the discs are secured to one plate and some to the other.

4. An improved clutch plate comprising a pair of plates arranged back-to-back having friction surfaces on their outer faces, means to prevent relative rotation between the plates, a plurality of non-flat (sprung) spring members adapted to be flattened under pressure arranged between the plates behind the said friction surfaces but always separated therefrom by the plates, and a rivet securing each spring member to one of the plates, characterized in that the members comprise cylindrically sprung round washers.

5. An improved clutch plate comprising a pair of plates arranged back-to-back having friction surfaces on their outer faces, means to prevent relative rotation between the plates, a plurality of non-flat (sprung) spring discs, adapted to be flattened under pressure, arranged between the plates behind the said friction surfaces but always separated therefrom by the plates, and a rivet positioned at the centre of pressure of each disc securing it to one of the plates, characterized in that the discs comprise cylindrically sprung round washers.

6. An improved clutch plate comprising a pair of plates arranged back-to-back having friction surfaces on their outer faces, means to prevent relative rotation between the plates and a plurality of non-flat (sprung) spring discs, adapted to be flattened under pressure, arranged between the plates behind the said friction surfaces but always separated therefrom by the plates, a rivet positioned at the centre of pressure of each disc securing it to one of the plates, and formed with a spacing neck and additional head arranged to secure the two plates together with a predetermined maximum distance of separation which may provide initial loading of the disc.

7. An improved clutch plate according to claim 6, characterized in that the discs are cylindrically sprung round washers.

8. An improved clutch plate comprising a pair of plates arranged back-to-back having friction surfaces on their outer faces, means to prevent relative rotation between the plates, a plurality of non-flat (sprung) spring discs, adapted to be flattened under pressure, arranged between the plates behind the said friction surfaces but always separated therefrom by the plates, a rivet positioned at the centre of pressure of each disc securing it to one of the plates and a friction ring on the outer side of the plate, forming the said friction surface and also secured by the said rivet.

9. An improved clutch plate comprising a pair of plates arranged back-to-back having friction surfaces on their outer faces, a plurality of non-flat (sprung) spring discs, adapted to be flattened under pressure, arranged between the plates behind the said friction surfaces but always separated therefrom by the plates, a rivet positioned at the centre of pressure of each disc securing it to one of the plates and formed with a spacing neck and additional head arranged to secure the two plates together with a maximum predetermined distance of separation which may provide initial loading of the disc.

10. An improved clutch plate comprising a pair of plates arranged back-to-back having friction surfaces on their outer faces, means to prevent relative rotation between the plates, a plurality of non-flat (sprung) spring discs, adapted to be flattened under pressure, arranged between the plates behind the said friction surfaces but always separated therefrom by the plates, a two-part rivet securing each disc to one of the plates, a friction ring on the outer side of the plate forming the said friction surface, one part of the rivet securing the friction ring to the plate and the other and concentric part serving to secure the disc to the plate.

11. An improved clutch plate according to claim 10, characterized in that the two-part rivet, when assembled embodies a spacing neck and additional head arranged to secure the two plates together with a predetermined maximum distance of separation which may provide initial loading of the disc.

12. An improved clutch plate comprising a pair of plates arranged back-to-back having friction surfaces on their outer faces, a plurality of non-flat (sprung) spring discs, adapted to be flattened under pressure, arranged between the plates behind the said friction surfaces but always separated therefrom by the plates, a rivet positioned at the centre of pressure of each disc securing it to one of the plates, and mounting means on each plate for connecting it to a driving member.

13. An improved clutch plate comprising a pair of plates arranged back-to-back having friction surfaces on their outer faces, a plurality of non-flat (sprung) spring discs, adapted to be flattened under pressure, arranged between the plates behind the said friction surfaces but always separated therefrom by the plates, a rivet positioned at the centre of pressure of each disc securing it to one of the plates, each plate being formed for axial flexibility in the region of the friction surfaces and formed at its centre for rigid connection to a common flange.

14. An improved clutch plate comprising a pair of plates arranged back-to-back having friction surfaces on their outer faces, means to prevent relative rotation between the plates and a plurality of non-flat (sprung) spring discs, adapted to be flattened under pressure, arranged between the plates behind the said friction surfaces but always separated therefrom by the plates, a rivet positioned at the centre of pressure of each disc securing it to one of the plates, and also arranged to secure the two plates together with a predetermined maximum distance of separation which may provide initial loading of the disc.

15. An improved clutch plate comprising a pair of plates arranged back-to-back having friction surfaces on their outer faces, means to prevent relative rotation between the plates and a plurality of non-flat (sprung) spring discs, adapted to be flattened under pressure, arranged between the plates behind the said friction surfaces but always separated therefrom by the plates, a rivet positioned at the centre of pressure of each disc securing it to one of the plates, and also arranged to secure the two plates together with a predetermined maximum distance of separation which may provide initial loading of the disc, some of the discs being secured to one plate and some to the other so that thereby the friction linings are secured to both plates.

NOEL BANNER NEWTON.